June 7, 1949. D. F. PRZYBYLSKI 2,472,758
TRENCH EXCAVATOR SHOVEL AND SCRAPER
Filed Nov. 23, 1945 2 Sheets-Sheet 1
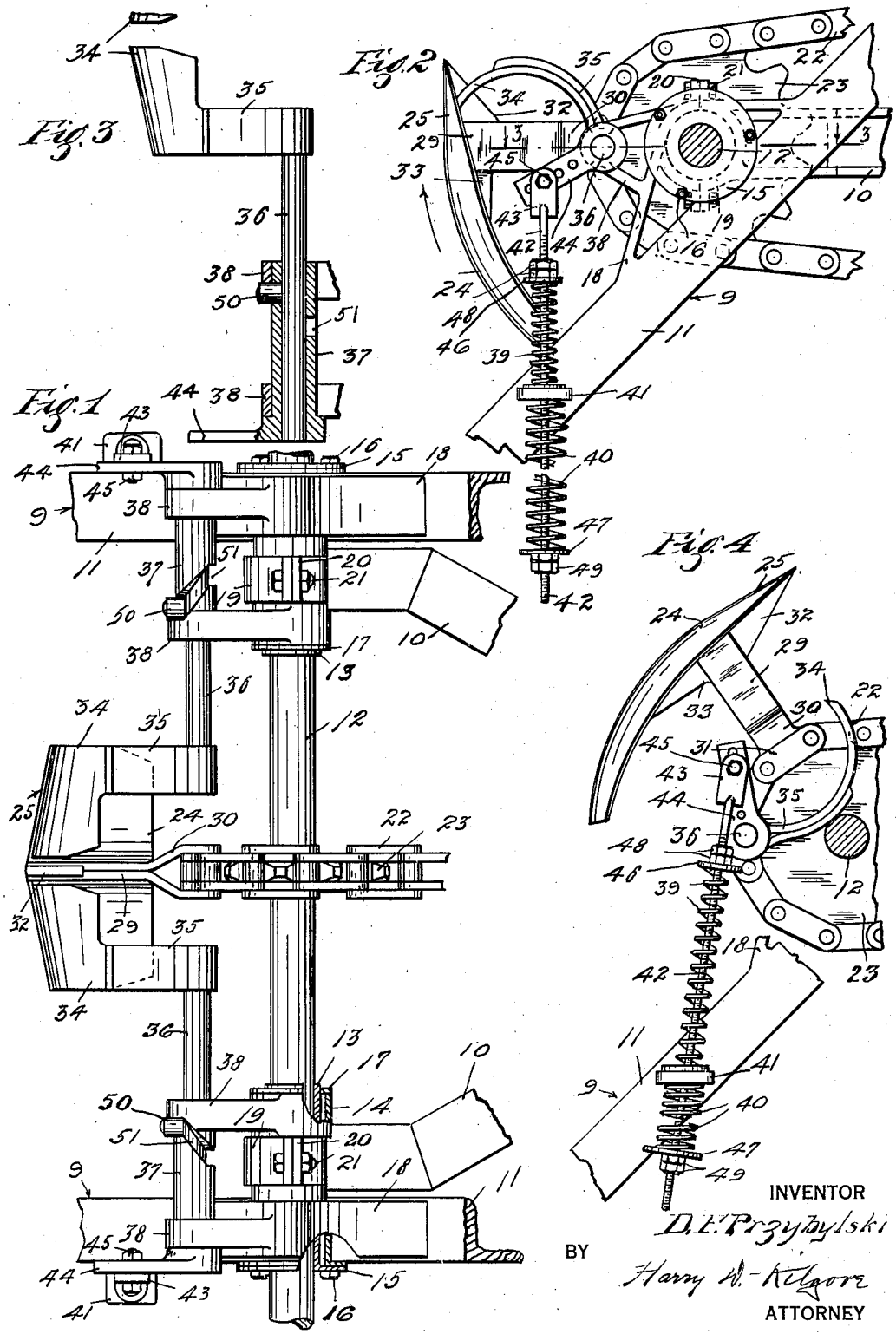
INVENTOR
D. F. Przybylski
BY Harry W. Kilgore
ATTORNEY

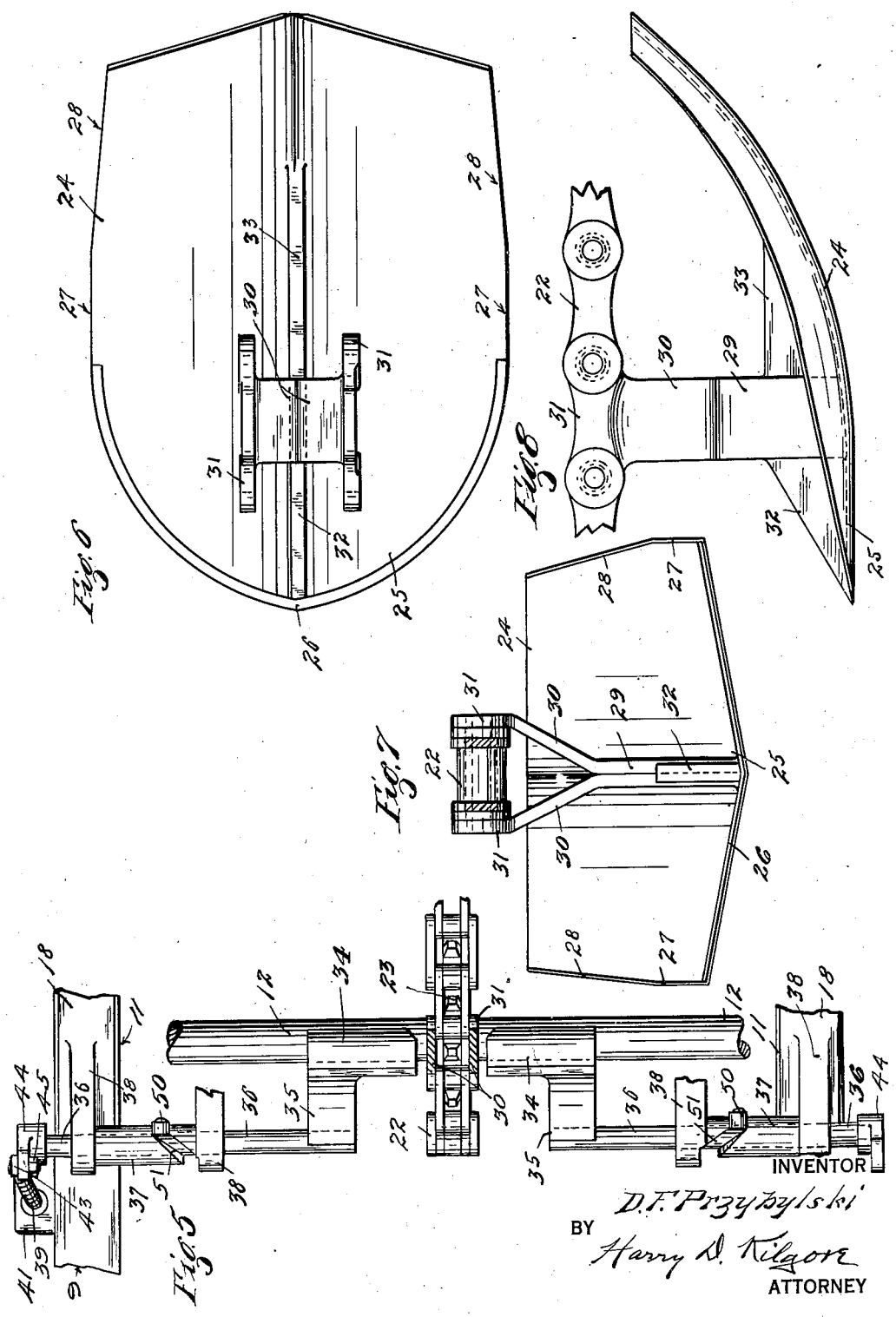

Patented June 7, 1949

2,472,758

UNITED STATES PATENT OFFICE 2,472,758

TRENCH EXCAVATOR SHOVEL AND SCRAPER

Daniel F. Przybylski, Winona, Minn.

Application November 23, 1945, Serial No. 630,311

6 Claims. (Cl. 37—83)

1

My present invention relates to improvements in trench excavators and, more particularly, to a shovel and scraper therefor.

While the invention is intended for general use in connection with trench excavators of the type employing a boom, an endless conveyor carrying a plurality of longitudinally spaced shovels, and a cross conveyor, it is especially well adapted for embodiment in my trench excavator disclosed and broadly claimed in my co-pending application executed of even date herewith and filed November 23, 1945, under Ser. No. 630,310.

The objects of this invention are: first, to provide a shovel having a novel point which will not hook a scraper therefor while passing the same; second, to provide a shovel which will not scrape the sides of a trench during the back and forth swaying of the boom; third, to provide a shovel which will cut the bottom of a trench substantially V-shape in cross section to facilitate the centering of tile in the trench and keep the same centered while filling the trench with soil dug therefrom; fourth, to provide a shovel which will dig and carry a capacity load; fifth, to provide a shovel scraper that is under spring tension at all times; sixth, to provide a shovel scraper which will move with a shovel when engaged by a rock or other object or substance adhering thereto and disengage itself therefrom, in case the obstruction is not removed by the scraper, and return to normal position; and seventh, to provide a sectional shovel scraper that will automatically separate when moved by the shovel and pass parts of the excavator in its path of movement.

These and other objects of the invention will be apparent from the following description, reference being had to the accompanying drawings.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 1 is a fragmentary plan view of certain parts of a trench excavator having the invention embodied therein;

Fig. 2 is a side elevation of the parts shown in Fig. 1;

Fig. 3 is a fragmentary detail view principally in section taken on the line 3—3 of Fig. 2;

Fig. 4 is a fragmentary detail view in side elevation showing the scraper in its extreme raised position and the sections thereof in their offset positions;

Fig. 5 is a fragmentary detail view showing the scraper positioned as shown in Fig. 4; and Figs. 6, 7 and 8 are enlarged views of the shovel in plan, in front elevation and in side elevation, respectively.

The numerals 9 and 10 indicate, respectively, fragments of the frame and the arms of a boom head fully shown and described in the application heretofore identified. The fragments of the frame 9 shown are a pair of upwardly and rearwardly inclined side angle bars 11.

A drive shaft 12 extends transversely of the frame 9 and is journaled in long babbeted bearings 13. These bearings 13 extend through concentric supporting sleeves 14 and radially spaced therefrom. The bearings 13 are connected to the supporting sleeves 14, at their outer ends, by overlapping flanges 15 which, in turn, are connected by a plurality of nut-equipped bolts 16. Secured to the inner ends of the supporting sleeves 14 are fixed collars 17 through which the bearings 13, at their inner end portions extend and are supported thereby.

The sleeves 14 rest transversely on the frame side bars 11 and are welded thereto. These sleeves 14 are further rigidly secured to the frame side bars 11 by metal straps 18 that are folded over the sleeves 14, welded thereto and they are also welded, at their ends, to said frame side bars.

The arms 10 of the boom head are connected to the sleeves 14 by two-part bearings 19 journaled thereon and support the boom, not shown, for swinging movement about the axis of the drive shaft 12. These bearings 19 have one of their members welded to the outer ends of the arms 10. The members of each bearing 19 have outturned lugs 20 connected by nut-equipped bolts 21.

An endless conveyor chain 22, fragmentarily shown, runs over a sprocket wheel 23 mounted on the drive shaft 12 at its longitudinal center. A plurality of shovels 24, only one being shown, are carried, at longitudinally spaced points, on the conveyor chain 22.

The shovel 24 has a point 25, the hardened cutting edge 26 of which is on arcs of two circles that intersect at the apex of said point. The side edges of the body of the shovel 24, rearwardly of the cutting edge 26, are for a relatively short distance, parallel, as indicated at 27, and rearwardly thereof they are in slight converging relation, as indicated at 28.

The body of the shovel 24 longitudinally at its transverse center, is on the arc of a circle having its center at the axis of the drive shaft 12. In cross section the body of the shovel 24 is in the form of a flat V. The point 25 of the shovel is tangent to the body of said shovel, see Fig. 8, for an important reason, as will hereinafter appear.

A post 29 is rigidly secured to the shovel point 25 at its transverse center. This post 29 is in the form of a Y and the arms thereof have on their outer ends parallel integral plates 31 that form one of the links in the conveyor chain 22. The shovel point 25, at its transverse center is longitudinally reinforced by a web 32 that extends from the post 29 to the apex of said point. The body of the shovel 24 is also longitudinally reinforced, at its transverse center, by a web 33 that extends rearwardly from said post. These reinforcing webs 32 and 33 also afford front and rear braces for the post 29.

The shovel 24 is cleaned, while dumping its load and at which time it is being moved upwardly around the sprocket wheel 23 by a pair of scraper blades 34. Each scraper blade 34 is carried by a two-ply arm 35 on the inner end of a rock shaft 36. Each scraper blade 34 and its arm 35 are in the form of a horizontally disposed semi-circle, the center of which is below said scraper blade and arm. The arms 35 are at the outer end portions of the scraper blades 34 and one of the plies of each arm 35 is integral with the respective scraper blade. This arrangement of the arms 35 leaves a large clearance space between said arms and around the conveyor chain 22 and the sprocket wheel 23 which extends therebetween.

The scraper blades 34 are endwise spaced to leave a passageway therebetween for the post 29 and the reinforcing webs 32 and 33 which pass therethrough during the travel of the shovel 24 past said scraper blades. To secure the arms 35 to the rock shafts 36, the respective end portions of their plies are separated, straddle said rock shafts and are welded thereto. The outer longitudinal edges of the scraper blades 34 are sharp and extend parallel and close to the respective surface of the body of the shovel 24 at it is moved past the same.

The rock shafts 36 are axially aligned and their outer end portions are mounted in long sleeve bearings 37 for independent compound turning and axial movements. These bearings 37 are rigidly secured to the sleeves 14 and the straps 18 by brackets 38 which, in turn, are rigidly secured to the straps 18 by welding.

Each scraper blade 34 is independently and yieldingly held under tension by upper and lower coiled spring 39 and 40, the former being relatively weak and the latter being relatively strong. These two springs 39 and 40 are in opposing relation and engage opposite sides of a spring base 41 on one of the frame side bars 11, as a base of resistance. A long screw-threaded rod 42 extends axially through the springs 39 and 40 and loosely through an aperture in the respective spring base 41. On the upper end of each rod 42 is a link 43 adjustably connected to a crank arm 44 on the inner end of one of the rock shafts 36 by a nut-equipped bolt 45 insertable through any one of a plurality of longitudinal holes in said arm.

The springs 39 and 40 are held compressed between the spring base 41 and spring followers 46 and 47, respectively. These spring followers 46 and 47 are, as shown, in the form of washers on the rod 42 and each thereof is adjustably held where positioned on said rod by pairs of nuts 48 and 49, respectively. Obviously, by adjusting the nuts 48 and 49 on the rod 42 the tension of the springs 39 and 40 may be varied, at will.

The sprocket wheel 23 and the conveyor chain 22 are in the path of movement of the scraper blades 34 when the same are moved upwardly with the shovel 24. To permit either one or both of the scraper blades 34 to pass the conveyor chain 22 and the sprocket wheel 23, the same are further separated to increase the width of the passageway therebetween, by axially moving one or both of the rock shafts 36. This axial adjustment of the rock shafts 36 is accomplished by roller-equipped cam studs 50 on said rock shafts that work in cam slots 51 in the sleeve bearings 37. It will be noted that the rock shafts 36 are eccentric to the drive shaft 12 and as the scraper blades 34 are moved with the shovel 24, they progressively swing away from said shovel. During movement of the scraper blades 34 with the shovel 24, it is progressively increasing the tension of the springs 40.

The purpose of making the shovel point 25 straight or tangent relative to the body of the shovel 24 is to permit the apex of said point to pass the scraper blades 34 with considerable clearance and thus prevent the same from hooking onto said scraper blades. As the apex of the shovel point 25 passes the scraper blades 34, said point gradually approaches said scraper blades and by the time the body of the shovel 24 reaches the scraper blades 34, it is in very close relation thereto.

In case a rock or other object or substance on the shovel 24 is not precipitated therefrom by the time said shovel reaches one of the scraper blades 34, said scraper blades will be engaged thereby and moved with the shovel 24.

It may be assumed that both scraper blades 34 are engaged by an obstruction on the shovel 24 and that said scraper blades are being moved with said shovel. The farther the scraper blades 34 move with the shovel 24, the greater the force exerted by the increasing tension of the springs 40 to remove the obstruction from said shovel. Also at this time the scraper blades 34 are swinging away from the shovel 24 and thus exert a force to pull the obstruction from said shovel. In case the scraper blades 34 have not removed the obstruction from the shovel 24 by the time it has reached the limit of its movement with the shovel 24, it will have cleared itself from the obstruction. At the time the scraper blades 34 remove the obstruction from the shovel 24 or move out of engagement therewith, the said scraper blades are returned independently to normal position by the springs 40 and at which time the spring 39 acts as a cushion for the returning crank arms 35 and associated parts. Sometimes the scraper blades 34 will be simultaneously released from an obstruction on the shovel 24 and at other times they will be released at different times. In some instances, only one of the scraper blades 34 will be engaged by an obstruction on the shovel 24 and this depends on the size and position of the obstruction on the shovel.

In addition to the reinforcing ribs 32 and 33, the novel shape of the shovel 24 both longitudinally and transversely also reinforces the same.

It will be understood that the invention described is capable of various modifications within the scope of the invention herein disclosed and claimed.

What I claim is:

1. In an excavator, the combination with a drive wheel and a conveyor arranged to run over said wheel, of a shovel having an upstanding post attached to the conveyor, a pair of scrapers for the shovel spaced apart to leave a passageway therebetween for the post, said scrapers being pivoted for independent movement with the shovel when held by an obstruction thereon, means independent of the pivotal movement of each scraper for moving the same outwardly from the post as said scraper is moved with the shovel, and yielding means under strain to hold each scraper in normal position.

2. In an excavator, the combination with a drive wheel and a conveyor arranged to run over said wheel, of a shovel having an upstanding post attached to the conveyor, a pair of scrapers for the shovel spaced apart to leave a passageway therebetween for the post, a pair of independent rock shafts on each of which one of the scrapers is secured, a crank arm on each rock shaft, yielding means under strain to hold each crank arm with the respective scraper in normal position, and means actuated by the turning of each rock shaft for bodily moving the respective scraper outwardly of the post as it is being moved by the shovel.

3. The structure defined in claim 1 in which the resistance of the yielding means is progressively increased as the scrapers are moved with the shovel.

4. In an excavator, the combination with a drive wheel and a conveyor arranged to run over said wheel, of a shovel having an upstanding post attached to the conveyor, a pair of scrapers for the shovel spaced apart to leave a passageway therebetween for the post, a pair of independent rock shafts on each of which one of the scrapers is secured, a crank arm on each rock shaft, yielding means under strain to hold each crank arm with the respective scraper in normal position, and automatic means for independently moving rock shaft axially away from the post during pivotal movement of the respective scraper with the shovel.

5. In an excavator, the combination with a drive wheel and a conveyor arranged to run over said wheel, of a shovel having an upstanding post attached to the conveyor, a pair of scrapers for the shovel spaced apart to leave a passageway therebetween for the post, a pair of independent rock shafts on each of which one of the scrapers is secured, a crank arm on each rock shaft, yielding means under strain to hold each crank arm with the respective scraper in normal position, and cam means for independently moving each rock shaft axially away from the post during pivotal movement of the respective scraper with the shovel.

6. In an excavator, the combination with a drive wheel and a conveyor arranged to run over said wheel, of a shovel having an upstanding post attached to the conveyor, a pair of scrapers for the shovel spaced apart to leave a passageway therebetween for the post, a pair of independent rock shafts on each of which one of the scrapers is secured, a crank arm on each rock shaft, yielding means under a strain to hold each crank arm with the respective scraper in normal position, a bearing for each rock shaft having a cam slot, and a cam pin on each rock shaft working in its cam slot, whereby when said rock shaft is turned by the respective scraper during pivotal movement thereof with the shovel, said cam slot and cam pin move said rock shaft axially outwardly of the post.

DANIEL F. PRZYBYLSKI.

REFERENCES CITED

The following references are of record in the file of this patent:

UNITED STATES PATENTS

| Number | Name | Date |
| --- | --- | --- |
| 1,199,366 | French | Sept. 26, 1916 |
| 1,217,752 | Greimann | Feb. 27, 1917 |
| 1,287,675 | Greimann | Dec. 17, 1918 |
| 1,481,602 | Greimann | Jan. 22, 1924 |
| 1,521,236 | Franks | Dec. 30, 1924 |
| 1,956,734 | Swanson | May 1, 1934 |